United States Patent

[11] 3,559,638

| [72] | Inventor | James A. Potter |
| | | 12 Greenhouse Blvd., West Hartford, |
| | | Conn. 06110 |
| [21] | Appl. No. | 668,917 |
| [22] | Filed | Sept. 19, 1967 |
| [45] | Patented | Feb. 2, 1971 |

[54] RESPIRATION METER HAVING SEVERAL MODES OF OPERATION
9 Claims, 1 Drawing Fig.

[52] U.S. Cl. .................................................. 128/2.08, 73/206
[51] Int. Cl. .................................................. A61b 5/08
[50] Field of Search ......................................... 128/2.08, 2.07, 145.5, 145.6, 145.8; 73/205, 206, 223; 235/151.34; 128/2.05(T); 128/2.08

[56] References Cited
UNITED STATES PATENTS
| 3,433,217 | 3/1969 | Rieke | 128/2.08 |
| 2,815,748 | 12/1957 | Boucke | 128/2.05(T) |
| 3,154,068 | 10/1964 | Reinert et al. | 128/2.08 |
| 3,232,288 | 2/1966 | Krobath | 128/2.08 |
| 3,319,624 | 5/1967 | Arp et al. | 128/2.08 |
| 3,414,896 | 12/1968 | Glick et al. | 128/145.8X |

Primary Examiner—Anton O. Oechsle
Attorney—John R. Ewbank

ABSTRACT: A respiration meter has the following modes of operation: instantaneous air flowrate; minute volume; cumulative volume; tidal volume; and breathing frequency. A selector switch directs an electrical signal indicative of instantaneous air flow along any of the plurality of electrical paths providing such modes of operation. A patient's breath is exhaled through a chamber in which it creates a pressure attributable to a restricted orifice, which pressure actuates an elastic diaphragm and an arm of a transducer producing such electrical signal.

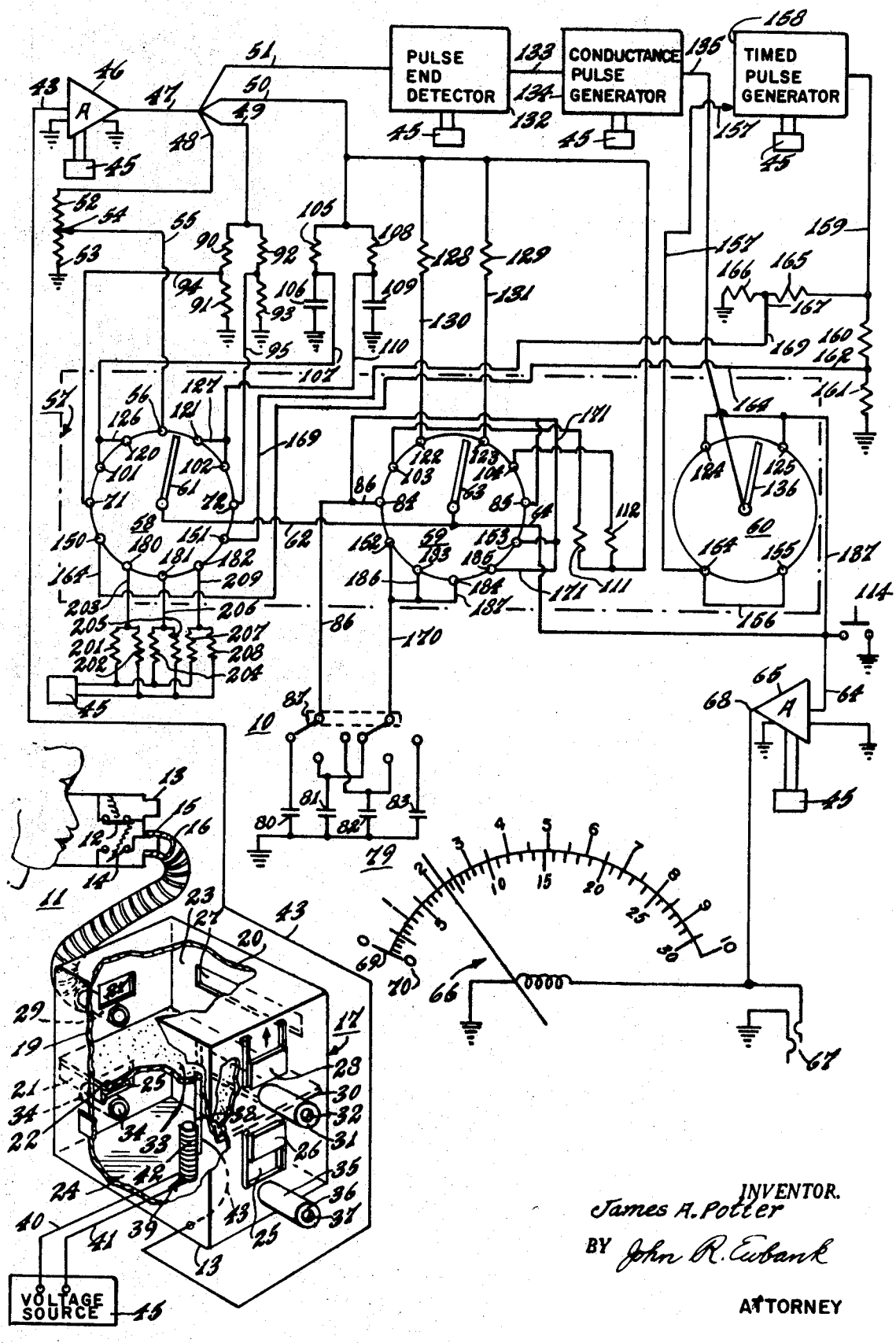

RESPIRATION METER HAVING SEVERAL MODES OF OPERATION

This invention relates to meters for measuring the flow of gas by the use of a transducer responsive to the pressure difference between room pressure and the pressure attributable to flow of the measured gas stream through a restricted orifice, and to flowmeters having integrating means permitting measurement of cumulative volume. The invention is concerned with the utilization of such metering systems in a respiration meter having a plurality of modes of operation, only one of which modes is as a spirometer.

During the early attempts at diagnosing ailments of animals and humans by measurements of respiration, clinicians were interested in measuring the largest amount of air a patient could breath in a single breath, and this volume was designated as vital capacity. Instruments designated as spirometers were designed to measure vital capacity, and often were large bulky machines normally maintained at their installation site. Clinicians subsequently became interested in the tidal volume of the patient, this volume being the average volume per breath during normal breathing. Some attempts were made to modify spirometers to provide a sufficiently accurate and reliable measurement of tidal volume by the use of spirometers. Anesthesiologists found that terms such as volume per minute provided useful criteria, and some instruments were designed to measure this kind of flow rate. Personal observation permitted approximate measurements of breaths per minute, but such measurements were tedious when it was desirable to record such measurements over a prolonged period of time. Various specialized instrumentation was available for respiration measurements, but the long standing demand for multipurpose respiration meter had not been met. Bulky apparatus, sometimes permanently installed in a remote part of a hospital, was sometimes available for some of the respiratory measurements, but this failed to meet the need for the long standing demand for a lightweight diagnostic instrument easily transported to and employed at the bedside of the patient.

STATEMENT OF INVENTION

In accordance with the present invention, a respiration meter features a transducer providing an electrical signal responsive to the instantaneous air flow rate of respiration, and a plurality of electrical paths between such basic signal and an indicating ma means such as a meter. Integrating means comprising a plurality of capacitors and resistors permit the instantaneous flow rate signal to be translated into an average flowrate signal, cumulative volume signal, tidal volume signal, and other useful measurements. A pulse and detector permits measurement of the frequency of breathing. Selector switches permit hospital technicians to conduct the desired measurements with minimized training. Desirably the transducer features an elastic diaphragm, the central portion of which is linearly shifted in response to the pressure in a chamber through which the respiration stream flows, there being a restricted orifice, and such linear movement of the central portion of the diaphragm actuates an electrical device providing an electrical signal indicative of the instantaneous rate of flow of such respiration stream. This type of transducer has the important advantage of having a sufficiently small resistance to gas flow that it does not jeopardize the breaking of an infant having respiratory ailments, while still providing a high degree of precision for gas flow rates of a healthy adult athlete strenuously exercising, thus providing acceptable precision throughout a remarkably wide range of flow rates.

DESCRIPTION OF PREFERRED EMBODIMENT

In the accompanying drawing, there is a generally schematic showing of a preferred embodiment of a respiration meter.

A measuring device 10 comprises a facemask 11 which can be employed to control the flow of the respiration stream to be measured, whether the patient be an animal or a human. In some situations, a tube to the throat of the patient serves as the facemask to supply the measuring device with the respiration gas stream to be measured, and the facemask terminology is intended to embrace all means for associating a flexible tube and the patient. The facemask 11 may be provided with an inhalation check valve 12 permitting gas to enter from an inhalation tube 13 and an exhalation check valve 14 permitting exhaled breath to leave through an exhalation tube 15. A flexible tube 16 connects the face mask 11 with a transducer 17. The transducer 17 comprises a base 18, sidewall 19, a top 20, a diaphragm-anchoring rim 21, an elastic diaphragm 22 anchored to such rim, a first chamber 23 above the diaphragm 22, and a second chamber 24 below the diaphragm. A set of ports 25 open the lower chamber 24 so that it is maintained at room pressure under normal conditions, but if the transducer 17 is to be employed for measuring inhalation flow rates, then portclosers 26 are shifted to partially seal the lower chamber 24. Similarly, the upper chamber 23 has ports 27 which are normally closed by portclosers 28, but which may be opened when the upper chamber 23 is to be maintained at room pressure during a respiration measurement. The upper chamber 23 communicates with a tube 29 to which is normally attached the flexible tube 16 from the facemask. A tube 30, to which supplemental tubing may be attached if desired, but which is normally not so used, also communicates with upper chamber 23. Particular attention is directed to bushing 31 inserted in tube 30, said bushing having a restricted orifice 32. When the exhaled breath from flexible tube 16 enters upper chamber 23, the pressure in the upper chamber increases, such pressure increase being attributable to the restricted orifice 32 through which the exhaled breath can escape. Such increase in the pressure in the upper chamber 23 causes a central portion 33 of the diaphragm 22 to be pushed downwardly.

The lower chamber 24 communicates with a tube 34 to which the flexible tube 16 from the facemask can be attached when it is desired to make a measurement of the inhalation respiration stream instead of the exhalation stream, such measurement also requiring the closing of the normally open ports 25 and the opening of the normally closed ports 27. A tube 35 includes a bushing 36 having a restricted orifice 37 calibrated to sufficiently restrict the inhalation gas stream entering lower chamber 24 that the central portion 33 of the diaphragm 22 is pulled down during the pulse of inhalation gas stream flow.

A lightweight arm 38 is suspended from the central portion 33 of the elastic diaphragm 22, so that it moves vertically downward as the diaphragm is pulled downward by the flow of the respiration gas stream to be measured. The elasticity of the diaphragm 22 provides the restoring force for returning the arm 38 and diaphragm to its normal position after the flow of respiration gas has ceased. The arm 38 actuates an electrical component 39 such as a potentiometer so that the electrical signal from the component 39 is regulated by the flow of the respiration gas through the transducer 17. A suitable voltage can be supplied to terminals 40, 41 of the transducer 17, and to a resistance strip 42 contacted by arm 38, from which the electrical signal is conducted by line 43. The manner of converting the vertical movement of the arm 38 into an electrical signal at line 43 can be varied by measuring instrument designers, so that the means are conveniently designated generically as a transducer instead of stressing the potentiometer conveniently illustrating such transducer function.

The supply of voltage to various electrical components can be in accordance with any conventional practice, there being in appropriate situations rectifiers, filters, voltage stabilizers and/or other supplemental components cooperating to provide a voltage source 45. A plurality of electrical components may share a common voltage source, but the schematic drawing conveniently indicates the utilization of a plurality of voltage sources 45 which can differ in appropriate characteristics but provide each component with a source of electrical power.

Standard procedures can be employed in the design and calibration of the restricted orifices 32 and 37 and resistance strip 42 and the voltage source 45 for the transducer 17 so that the electrically measured instantaneous flow rates throughout the intended range of usefulness of the measuring device correspond at calibration conditions with the precisely regulated flow rates.

The signal at line 43 can be designated as an airflow rate analogue, and represents an electrical translation of the transducer 17 of the instantaneous airflow rate. An amplifier 46 transforms the signal of line 43 into an amplified airflow rate signal 47, and various branches 48, 49, 50, and 51 are available for transmitting such signal 47 to other portions of the measuring device. The amplifier 46 can be any of several commercially available amplifiers having an accuracy such that the variations in the amplified signal do not differ from the variations in the input signal by more than about 2 percent. The amplified airflow rate signal 47 is a direct current signal designed to permit appropriate integration by the use of capacitors and resistances.

The operation of the measuring device in the instantaneous flowrate mode of operation can be clarified. A line 48 transmits the amplified airflow rate signal 47 to one end of a potentiometer 52, the other end of which is grounded by line 53. Similarly, the negative portion of each of the voltage supplies 45 can be grounded. A selected tappoint 54 permits a signal to flow by line 55 to contact 56 of a selector switch 57. It is convenient to show the selector switch 57 as comprising three rotary switches 58, 59, 60, operating as a unit by reason of being either on a common shaft or equivalent common operation. When selector switch 57 is shifted to achieve instantaneous flowrate mode of operation, an arm 61 of rotary switch 58 transmits the signal from contact 56 to a further point in the circuit. A line 62 extends from the arm 61 to arm 63 of rotary switch 59, but inasmuch as rotary switch 59 does not function during the instantaneous flowrate mode of operation, such connection is merely noted. A line 64 extends from the arm 61 (and thus from arm 63 also) to an amplifier 65, which receives a high impedance signal and produces at its output an amplified DC signal proportional to within about 2 percent of the voltage magnitude of its high impedance input. The input impedance is of the order of 100,000,000 ohms and functions on a DC signal in the range from 0 to 20 volts in a typical embodiment of the invention. The output of the amplifier 65 must be of relatively low impedance and moderate power to drive a milliammeter 66 and to drive any supplemental indicating means, such as a recording milliammeter, connected through an outlet 67. A line 68 connects the amplifier 65 with the milliammeter 66 and to the outlet or jack 67. The milliammeter 66 can be provided with two scales 69, 70 one being a square root of 10 multiple of the other, and conveniently designated as the 10 scale and 30 scale.

The clarification of the minute volume mode of operation of the measuring device requires the explanation that the flowrate is averaged over a significant portion of a minute to provide a measurement in Liters per minute as a gas flow rate. In normal breathing the changes in minute volume are ordinarily gradual. A feature of the present invention is the measurement of minute volume by averaging the electrical signal for instantaneous flowrate by utilizing condensers to modify the speed of response of the meter.

The selector switch 57 has 12 positions, and the various modes of operation can be identified in the drawing as if at a time on a clock face. Thus, the instantaneous flowrate mode is at 12 o'clock, and the minute volume mode having a 10 liters per minute maximum is at 9 o'clock, and the minute volume mode having a maximum above 30 liters per minute is a 3 o'clock. Contact 71 in rotary switch 58 and contact 84 in rotary switch 59 function in the lower minute volume mode, and contact 72 and contact 85 serve analogously in the higher minute volume.

A branch 49 of the amplified instantaneous flowrate signal 47 is directed toward a grounded potentiometer having resistances 90 and 91, and a line 94 transmits the signal to contact 71, thence to arm 61, thence to arm 63, thence to contact 84, and thence by line 86 to gang switch 87.

During the 30 liter per minute mode, two resistances 92 and 93 modify the instantaneous flowrate signal 49, so that the signal reaching contact 72 by line 95 differs from the signal reaching contact 71, and is essentially smaller by a division corresponding to the square root of 10. Line 171 connects a contact 85 with line 86 to gang switch 87 of capacitor bank 79.

A bank 79 of capacitors 80, 81, 82, 83 is controlled by gang switch 87. The capacitors are adapted to modify the speed of response of the ammeter 66. Suitable values for the capacitors are 1, 4, 10, and 40 microfarads respectively, but instrument designers could select other values. The shifting of the gang switch 87 can modify the speed of response of the milliammeter 66 to make it faster or slower than it might be at some other intermediate position. Not only does the capacitor bank 79 permit such regulation of the speed of response of the milliammeter 66, but it also serves to average the instantaneous flowrate signal so that the milliammeter 66 provides a reading which is an accurate measure of the liters per minute of breathing. Scale 69 is read during the 10 liter per minute mode, and scale 70 is read when selector switch 57 is adjusted to the 30 liters per minute mode.

The measuring device can be operated in a cumulative volume mode by shifting gang switch to a 10 o'clock or 2 o'clock position. In rotary switches 58, 59 the contacts 101, 103 are for the 1 liter mode, and contacts 102, 104 are for the 3 liter mode.

The amplified instantaneous flowrate signal 47 advances by branch 50 to resistor 105, and accumulates and is integrated by capacitor 106. Line 107 transmits such integrated signal to contact 101, and thence to line 64 to amplifier 65. Resistance 111 is intermediate contact 103 and branch 50. The exhaled breath cumulatively increases the reading on the milliammeter 66 until the maximum reading is reached and/or until a reset button 114 is pushed to ground the condensors momentarily and return the milliammmeter 66 to zero reading. It is generally desirable to push the reset button momentarily just before starting a cumulative volume measurement. During operation on the higher range of cumulative volume mode, the instantaneous flowrate signal in branch 50 goes to resistor 108 and to resistor 112, and is integrated by capacitor 109. The flow through line 110, contact 72, and to the ammeter 66 follows the usual route.

The measuring device can be operated in a tidal volume mode by shifting the gang switch 57 to an 11 o'clock or 1 o'clock position. In rotary switches 58, 59, and 60 contacts 120, 122, and 124 are for the 1 liter per breath mode, and contacts 121, 123, and 125 are for the 3 liters per breath mode.

A resistance 128 is intermediate line 130 (from contact 122 of switch 59) and branch 50, thus differing from resistance 111 of the smaller cumulative volume mode of operation. Correspondingly, resistor 129 and line 131 connect branch 50 and contact 123. The similarity of the cumulative volume mode and tidal volume mode is suggested by line 126 connecting tidal volume contact 120 and cumulative volume contact 101, and by line 127 connecting contacts 121 and 102. However, the milliammeter 66 is reset to zero automatically at the end of each breath in tidal volume mode instead of manually as desired by the clinician in cumulative volume mode.

The instantaneous flowrate signal 47 flows by branch 51 to pulse end detector 132, which directs at the end of each breath a pulse by line 133 to conductance pulse generator 134. A conductance assignor function is assumed by rotary switch 60, having an arm 136 receiving the conductance pulses by line 135 from the conductance pulse generator 134. Line 137 transmits the conductance pulses by each of contacts 124 and 125 to line 64, and thus each pulse neutralizes the capacitor and returns the milliammeter 66 to zero. As the patient exhales, the needle of the milliammeter advances, reaching a value corresponding to the tidal volume, and then at the end of the exhalation and during the inhalation, the pulse automatically returns the needle to zero. During normal breathing, the tidal volume measurement for each breath is substantially the same, so that the observation of the momentary position of the needle is not difficult. If the patient is asked to take the greatest breath of which he is capable, and then to exhale it in a single breath, then the measuring device can be used as a spirometer to measure vital capacity while the selector switch is maintained in either the cumulative volume mode or in the tidal volume mode.

The measuring device can be operated in a frequency mode by shifting the selector switch 57 to an 8 o'clock or 4 o'clock position. In rotary switches 58, 59, 60 contact 150, 152, and 154 are for the 30 breaths per minute mode, and contacts 151, 153, and 155 are for the 100 breaths per minute mode. The conductance pulse generator 134 directs pulses by line 135 to the rotary switch 60, and thence to timed pulse generator 158 by line 157. A line 156 connects contacts 154 and 155. The timed pulse generator 158 receives each of the conductance pulses and, regardless of its strength or duration, translates it into a pulse of predetermined magnitude and predetermined duration at output line 159. Resistors 160 and 161 modify a signal from line 159 before transmittal by line 164 to contact 150 of rotary switch 58. The capacitor bank 79 averages the pulses by reason of line 170 between contact 152 and gang switch 87. Similarly, when in the higher range of frequency mode of operation, resistances 165 and 166 modify a signal transmitted by line 169 to contact 151, and lines 171 and 86 connect gang switch 87 with contact 153.

The measuring device 10 can be subjected to certain testing by shifting the gang switch 57 to any of 5, 6, or 7 o'clock positions. Resistances 201 and 202 modify the signal sent by line 203 to contact 180 of rotary switch 58. Lines 86 and 170 connect capacitor bank 79 and gang switch 87 to contact 183 of rotary switch 59. Similarly resistors 204, 205, line 206, contact 181, line 187, and contact 184 provide a similar testing mode, as do resistors 207, 208, line 209, contact 182, line 171, and contact 185. During the testing of the meter such components as transducer 17, amplifier 46, pulse and detector 132, conductance pulse generator 134, rotary switch 60, and timed pulse generator 158 are not being utilized.

Although an illustrative embodiment has been described, the measuring instrument of the present invention can be constructed differently from such embodiment. Particular attention is directed to the utilization of a transducer for converting into an electrical signal the instantaneous flowrate of the breath of the patient whose respiration is being analyzed. The respiration meter of the present invention features a selector switch by which the measuring device can be shifted to any of a plurality of modes of operation. Any of a variety of electrical systems might be used to accomplish the various translations of the gasflow rate electrical signal into signals for at least some of the modes of operation, but prior instrument manufacturers have heretofore lacked the concept of providing the combination of the modes of operation available by the measuring device of the present invention. The superiority of the present respiration meter over respiration meters of the prior art is attributable in part to the achievement of a sufficiently compact, convenient instrument characterized by the selector switch permitting the particular combination of modes of operation herein described. The invention also features a respiration meter employing an elastic diaphragm actuated transducer, thereby achieving an appropriate degree of precision throughout an extremely wide range of measurements, and without excessively troublesome pressure drops attributable to the use of a respiration meter.

Various modifications of the invention are possible without departing from the scope of the invention as set forth in the appended claims.

I claim:

1. In a respiration measuring device for measuring a plurality of characteristics of the respiration of a clinical patient wearing a face mask connected by a breathing tube to the measuring device, the gas stream flowing through said breathing tube being the gas stream to be measured, the combination of: transducer means comprising a restricted orifice through which flows at least a portion of a gas stream and said flow through said restricted orifice imparts a pressure different from ambient pressure, said transducer means being responsive to the pressure difference between ambient pressure and said gas pressure attributable to said orifice, said transducer means providing an electrical signal indicative of the instantaneous flow rate of said gas stream flowing through said breathing tube; a plurality of alternative circuit means for translating said electrical signal to provide an amplified measurement of a respiration characteristic, one of said measurements being instantaneous flow rate and other of said measurements being of respiration characteristics other than instantaneous flowrate and including breath volume one of said circuit means comprising capacitors adapted to integrate flow rate measurements into volume measurements; at least one selector switch controlling the selection of the alternative circuit means translating the electrical signal of the transducer means to provide measurements of each of the plurality of respiratory characteristics; and indicating means providing a display of the measurement of the selected characteristic of the patient s respiration, said characteristic being the instantaneous flow rate when said selector switch is adjusted to an instantaneous flow rate mode of operation and said characteristic being a volume measurement when said selector switch is adjusted to a volume mode of operation.

2. The measuring device of claim 1 in which the indicating means comprises a milliammeter, and the breathing tube is flexible and adapted to decrease the transmission of shock, vibration, and mechanical movement from the facemask to the transducer means.

3. The measuring device of claim 1 in which said circuit means includes means for averaging the signal from said transducer, whereby said indicating means measures the flow rate averaged over a significant portion of a minute.

4. The measuring device of claim 1 having: a reset switch means actuable to adjust the indicating means to zero when desired and at the beginning of each measurement; at least one integrating capacitor for translating said electrical signal of said transducer into a cumulative volume signal; and one of said circuit means selectable by said selector switch including means for measuring the cumulative volume of the patient's breath.

5. The measuring device of claim 1 having: a pulse end detector for detecting an end point in said gas flow; a conductance pulse generator actuated by the pulses from the pulse end detector; a conductance pulse assignor means for switching the conductance pulses for discharging any integrating capacitor for translating the instantaneous flow rate signal of the transducer into a signal indicative of the cumulative volume per breath and being discharged automatically at the end of each breath as detected by said end point of said gas flow, whereby the maximum reading of the indicating means during each breath is a measure of the partient's tidal volume.

6. A measuring device in accordance with claim 5 wherein there is: a timed pulse generator means within the selector switch operative while the selector switch is adjusted to frequency mode of operation for directing said conductance pulses to said timed pulse generator; switching means directing the output of the timed pulse generator through circuit means in which such output signals are averaged, modified by resistors, and amplified to provide a signal actuating the indicating means to provide a reading indicative of the number of breaths per minute.

7. The measuring device of claim 6 said selector switch includes switching means adapted to permit testing of the measuring device.

8. The measuring device of claim 1 wherein said transducer means includes a shiftable electrical component and a fixed electrical component, said shiftable and fixed electrical components cooperating to control an electrical signal indicative of the position of the shiftable electrical component; a first chamber, said restricted orifice modifying the flow of at least substantially all of the gas stream in said breathing tube to impart a nonambient pressure in said first chamber; a zone-type second chamber maintained at substantially ambient pressure; an elastic diaphragm separating the two chambers, the central portion of said diaphragm being shifted by the changes in pressure in the first chamber attributable to the gas flow through the restricted orifice, said shiftable electrical component being moved by the central portion of the diaphragm to control said signal.

9. The measuring device of claim 1 wherein said alternative circuit means are additionally selectable by said selector switch to measure a low range of averaged volume per unit time, to measure a high range of average volume per unit time, to measure a low range of cumulative volume, to measure a high range of cumulative volume, to measure a low range of volume per breath, to measure a high range of volume per breath, to measure a low range of breaths per unit time, and to measure a high range of breaths per minute; said alternative circuit means including means for converting the electrical signal from the transducer means for actuating the indicating means in each of the plurality of modes of operation; and a pair of scales in the indicating means, the higher scale being the square root of 10 multiple of the lower scale.